(12) United States Patent
Olcott et al.

(10) Patent No.: US 8,575,534 B2
(45) Date of Patent: Nov. 5, 2013

(54) CROSS-STRIP CHARGE MULTIPLEXING READOUT FOR DIFFERENTIAL DETECTOR ARRAYS WITH CAPACITIVE ROW AND COLUMN CHARGE SPLITTERS

(75) Inventors: Peter D. Olcott, Stanford, CA (US); Craig S. Levin, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 761 days.

(21) Appl. No.: 12/661,890

(22) Filed: Mar. 25, 2010

(65) Prior Publication Data

US 2010/0243865 A1 Sep. 30, 2010

Related U.S. Application Data

(60) Provisional application No. 61/211,267, filed on Mar. 25, 2009.

(51) Int. Cl.
*G01J 1/42* (2006.01)
*H01J 40/14* (2006.01)

(52) U.S. Cl.
USPC .................................. 250/208.2; 250/214 R

(58) Field of Classification Search
USPC .......... 250/208.1, 208.2, 214 R, 206, 559.29, 250/214 A, 368, 370.1, 370.11, 370.12, 250/206.2, 206.1, 363.02, 363.01, 363.03, 250/363.04, 366, 369; 356/608, 615; 348/311, 312, 322, 320, 323, 321; 327/514
See application file for complete search history.

(56) References Cited

U.S. PATENT DOCUMENTS

| | | | | |
|---|---|---|---|---|
| 3,772,521 A | * | 11/1973 | Perez-Mendez | 250/385.1 |
| 4,055,765 A | * | 10/1977 | Gerber et al. | 250/370.09 |
| 4,616,213 A | * | 10/1986 | Danish | 341/21 |
| 5,574,744 A | * | 11/1996 | Gaw et al. | 372/50.21 |
| 5,719,400 A | | 2/1998 | Cherry et al. | |
| 6,326,624 B1 | * | 12/2001 | Chapuis et al. | 250/369 |
| 6,339,216 B1 | * | 1/2002 | Wake | 250/214 A |
| 6,552,348 B2 | | 4/2003 | Cherry et al. | |
| 6,740,859 B1 | | 5/2004 | Wojcik et al. | |
| 6,781,133 B2 | | 8/2004 | Karplus et al. | |
| 7,728,297 B2 | * | 6/2010 | Masafumi | 250/338.3 |
| 2004/0146192 A1 | * | 7/2004 | Langan et al. | 382/132 |
| 2005/0206752 A1 | * | 9/2005 | Lim | 348/241 |
| 2007/0023669 A1 | * | 2/2007 | Hefetz et al. | 250/370.14 |
| 2007/0217789 A1 | | 9/2007 | Olcott et al. | |
| 2010/0010343 A1 | | 1/2010 | Daghighian et al. | |

OTHER PUBLICATIONS

Anger, "Sensitivity, Resolution and Linearity of the Scintillation Camera", 1966, pp. 380-392, IEEE Transactions on Nuclear Science, v13n3.

(Continued)

*Primary Examiner* — Que T Le
*Assistant Examiner* — Jennifer Bennett
(74) *Attorney, Agent, or Firm* — Lumen Patent Firm

(57) ABSTRACT

An array of two-terminal detectors is configured to provide output signals that provide position sensitive radiation detection (e.g., outputs A and B provide vertical position and outputs C and D provide horizontal position), and which are differential (i.e., signal A+B is equal and opposite to signal C+D). Preferably, a capacitive network is employed to provide the position sensitivity. Array outputs are preferably provided to a low impedance amplifier or opto-electronic coupler.

9 Claims, 3 Drawing Sheets

(56) References Cited

OTHER PUBLICATIONS

Lau et al., "Noise Analysis of LSO-PSAPD PET Detector Front-End Multiplexing Circuits", 2007, pp. 3212-3219, IEEE 2007 Nuclear Science Symposium Conference Record.

Siegel et al., "Simple Charge Division Readouts for Imaging Scintillator Arrays using a Multi-Channel PMT", 1996, pp. 1634-1641, IEEE Transactions on Nuclear Science, v43n3.

Olcott et al., "Compact Readout Electronics for Position Sensitive Photomultiplier Tubes", 2005, pp. 21-27, IEEE Transactions on Nuclear Science, v52n1.

\* cited by examiner

CROSS-STRIP CHARGE MULTIPLEXING READOUT FOR DIFFERENTIAL DETECTOR ARRAYS WITH CAPACITIVE ROW AND COLUMN CHARGE SPLITTERS

CROSS REFERENCE TO RELATED APPLICATIONS

This application claims the benefit of U.S. provisional patent application 61/211,267, filed on Mar. 25, 2009, entitled "Cross-strip charge multiplexing readout for differential detector arrays", and hereby incorporated by reference in its entirety.

FIELD OF THE INVENTION

This invention relates to position sensitive radiation detection.

BACKGROUND

It is often desirable for a radiation detector to provide position sensitivity for detected radiation, in addition to the basic indication of whether or not radiation is present. Such position sensitivity is exploited in numerous applications, such as medical imaging. Positron emission tomography (PET) and single photon emission computed tomography (SPECT) are two examples of medical imaging techniques that rely on position sensitive radiation detection.

Accordingly, methods for providing detector position sensitivity have been extensively investigated for many years. One early example is considered by Anger in an article "Sensitivity, resolution and linearity of the scintillation camera" (IEEE Transaction on Nuclear Science, v13 n3 pp 380-392, June 1966). In this example, an electrical network is connected to an array of photomultiplier tubes (PMTs) such that the network outputs provide an indication of which PMT provided the detection signal (i.e., position sensitivity). Another approach that has been considered is the use of an array of small detectors having individual detector outputs. Such an array can provide pixel-level position information, where the array elements serve as the pixels.

However, such approaches for providing position sensitivity have noteworthy disadvantages in practice. In particular, complicated circuitry and/or a large number of output connections may be required. For example, the above-referenced approach of Anger requires four capacitors for each detector element, where the capacitance values of each of these numerous capacitors are critical for the accuracy of the position sensitivity. An individually addressed array of detector elements requires an output for each detector element. Since present day medical imaging techniques frequently make use of a large number of 2-D position sensitive detectors to provide 2-D and 3-D imaging, this complexity often becomes burdensome. Multiplexing approaches (e.g., as considered in U.S. Pat. No. 7,495,201) have been considered to reduce complexity.

However, there remains a need in the art for improved position sensitive detection, especially in connection with solid state detectors.

SUMMARY

In the present approach, an array of two-terminal detectors is configured to provide output signals that provide position sensitive radiation detection (e.g., outputs A and B provide vertical position and outputs C and D provide horizontal position), and which are differential (i.e., signal A+B is equal and opposite to signal C+D). Preferably, a capacitive network is employed to provide the position sensitivity. Array outputs are preferably provided to a low impedance amplifier or optoelectronic coupler.

This approach provides significant advantages. Because the output signals are differential, it is possible to reject common-mode spurious signals, as commonly occurs in medical imaging application due to interference and coupling from external electronics (e.g., an MRI system) to the detector array. Such common-mode rejection can be performed with analog or digital signal processing. Although common mode spurious signals can also be mitigated by the use of electromagnetic shielding for the detector array, such shielding can be difficult and/or expensive to provide in practice. Thus, the differential output signals provided by the present approach are significantly advantageous.

Another advantage of the present approach is that the total number of outputs for a detector array can be substantially less than the number of detectors in the array. This advantageously reduces the total number of detector array outputs, which is especially important in large scale imaging systems having numerous detector arrays.

A further advantage of the present approach is that the impedance seen by each detector in the array can be made the same or nearly the same. This high degree of uniformity helps to reduce dispersion in the detector array (e.g., variation in sensitivity as a function of position).

Another advantage of the present approach is that it is possible to multiplex detectors having high parasitic capacitance (e.g., solid state detectors) without suffering a loss in speed due to RC delay. This can be done in preferred embodiments where the multiplexing is performed capacitively as opposed to using a resistive network. Although resistive multiplexing networks are commonly employed in connection with PMTs (which have very low parasitic capacitance), such resistive networks are not suitable for use with solid state detectors.

DETAILED DESCRIPTION

Figure 1:
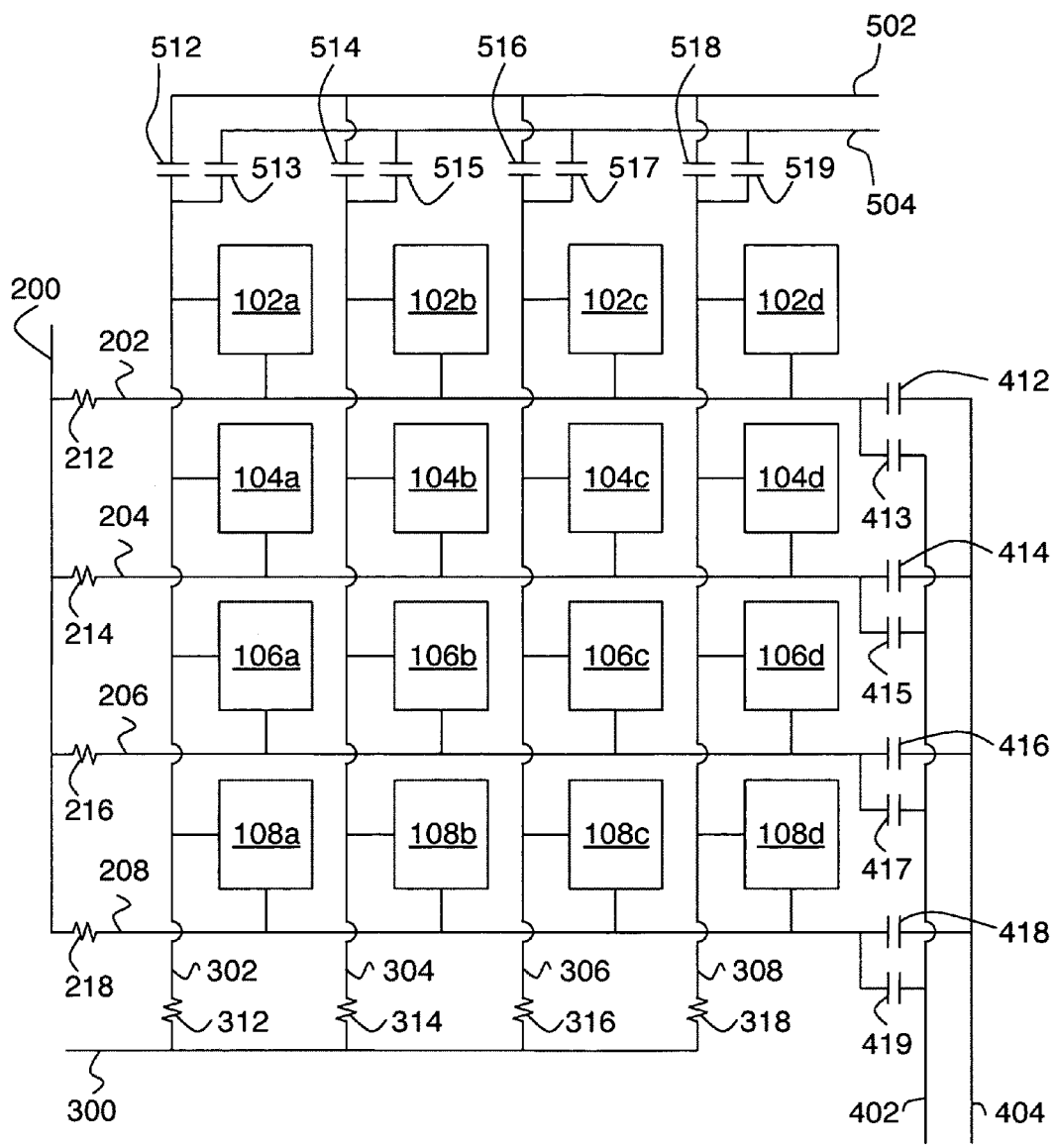
FIG. 1 shows an example of an embodiment of the invention.

FIG. 1 shows an example of an embodiment of the invention. In this example, detectors are logically arranged in rows and columns. More specifically, detectors 102a, 102b, 102c and 102d are in one logical row. Similarly, detectors 104a, 104b, 104c and 104d are in a second logical row, detectors 106a, 106b, 106c and 106d are in a third logical row, and detectors 108a, 108b, 108c and 108d are in a fourth logical row. Detectors 102a, 104a, 106a, and 108a are in one logical column. Similarly, detectors 102b, 104b, 106b and 108b are in a second logical column, detectors 102c, 104c, 106c and 108c are in a third logical column, and detectors 102d, 104d, 106d and 108d are in a fourth logical column. Although this example shows a 4×4 array, the present approach is applicable to arrays having any number of rows and columns.

The above described "logical arrangement" refers to the way the detectors are electrically connected, as opposed to the geometrical location of the detectors. More specifically, each row of detectors has its corresponding row line (e.g., row line 202 corresponds to detectors 102a-d, and similarly for row lines 204, 206, and 208), and each column of detectors has its corresponding column line (e.g., column line 302 corresponds to detectors 102a, 104a, 106a, and 108a, and similarly for column lines 304, 306, and 308). Practice of the invention does not depend critically on the geometrical positions of the detectors, as long as they are logically organized in rows and columns (e.g., as in FIG. 1). For example, an array of detectors can have this kind of logical organization even if the detectors are positioned at irregular intervals on a plane, or are disposed on a non-planar substrate (e.g., on an inward facing cylindrical surface). In most cases, it is preferred for the detectors to be disposed at regular intervals on a planar substrate.

Power and bias is provided to the circuit of FIG. 1 via a row bus 200 and a column bus 300. Row bus 200 is connected to row lines 202, 204, 206, and 208 via bias resistors 212, 214, 216, and 218. Column bus 300 is connected to row lines 302, 304, 306, and 308 via bias resistors 312, 314, 316, and 318. Practice of the invention does not depend critically on the resistance values of the bias resistors, or on the applied bias voltages.

Each of the detector elements 102a-108d is a two terminal device that provides a differential sensor output in response to incident radiation. A two terminal detector element provides a differential sensor output because the response at its terminals due to a detection event is equal and opposite (e.g., equal and opposite current flow or voltage). Having a differential output is useful because many sources of error (e.g., electromagnetic interference) are common-mode (i.e., are the same at both terminals of the detector). By forming the difference of the detector element outputs, the useful detection signal can be preserved, while spurious common-mode signals can be rejected. In practice, the rejection of common-mode signals can be performed with analog signal processing, digital signal processing, or any combination thereof.

The radiation being sensed can be from any part of the electromagnetic spectrum. Direct detection and/or indirect detection can be employed. Direct detection entails the absorption of the radiation of interest directly by the detector. Indirect detection entails the absorption of the radiation of interest by a scintillation material (not shown) disposed near the detector, followed by emission of radiation from the scintillation material that is detected by the detector. For example, scintillation materials are frequently used in gamma ray cameras to provide optical radiation in response to incident gamma radiation. Detection of this optical radiation provides data on the incident gamma rays (e.g., position).

The detectors can be any radiation-sensitive devices that are two terminal devices having a differential output as described above. Suitable devices include solid state detectors, such as solid state photomultipliers and avalanche photodiodes. Conventional photomultiplier tubes are not suitable for practicing the invention because they do not provide a differential output. The PMT output is normally taken to be the anode. A conventional PMT has more than two terminals, so there is no single terminal of the PMT that provides an equal and opposite signal relative to the PMT anode.

The detector array is connected to row outputs 402 and 404, and to column outputs 502 and 504. In the following, it will be convenient at times to refer to outputs 402 and 404, respectively, as row outputs $O_A$ and $O_B$ having row output signals A and B, and to refer to outputs 502 and 504, respectively, as column outputs $O_C$ and $O_D$ having column output signals C and D. Thus output signal A is the signal (e.g., voltage or current) that is present at output $O_A$. Output $O_A$ could be a wire, board trace or a chip pin, etc. The other signals are related to their corresponding outputs in the same way.

The row and column outputs are connected to the detectors such that the total row output signal A+B and the total column output signal C+D are differential signals for any detection event sensed by the array. Because these two signals are differential, spurious common-mode signals can be rejected. For example, a sum signal S=A+B−C−D can be formed. Any common mode signal present on A, B, C, and D will be removed from this sum signal. Any other approach for common mode rejection that relies on A+B and C+D being equal and opposite can also be employed. As indicated above, the rejection of common-mode signals can be performed with analog signal processing, digital signal processing, or any combination thereof.

The example of FIG. 1 shows one approach for providing such differential outputs. More specifically, each of the detectors has one of its terminals connected to its corresponding row line and its other terminal connected to its corresponding column line. Furthermore, there is the following consistency in the detector connections: all of the detector anodes are connected to the row lines and all of the detector cathodes are connected to the column lines (or vice versa). Any other wiring approach that also provides these differential outputs is also suitable for practicing the invention.

The relative amplitude of A and B enables vertical position determination and the relative amplitude of C and D enables horizontal position determination. For convenience, the terms "vertical" and "horizontal" here refer to logical position as opposed to physical position. For example, the logical vertical position is the position relative to the array rows, and the logical horizontal position is the position relative to the array columns. In cases where the mapping from logical position to physical position is nontrivial, a correction derived from this mapping can be applied to convert logical position to physical position.

The example of FIG. 1 shows an approach for providing such position sensitive outputs. In this example, each row line is connected to a corresponding capacitive row charge splitter, and each column line is collected to a corresponding capacitive column charge splitter. The row charge splitter formed by capacitors 412 and 413 is connected to row line 202. The row charge splitter formed by capacitors 414 and 415 is connected to row line 204. The row charge splitter formed by capacitors 416 and 417 is connected to row line 206. The row charge splitter formed by capacitors 418 and 419 is connected to row line 208. Similarly, the column charge splitter formed by capacitors 512 and 513 is connected to column line 302. The column charge splitter formed by capacitors 514 and 515 is connected to column line 304. The column charge splitter formed by capacitors 516 and 517 is connected to column line 306. The column charge splitter formed by capacitors 518 and 519 is connected to column line 308.

All of the row charge splitters are connected to the row outputs 402 ($O_A$) and 404 ($O_B$). Similarly, all of the column charge splitters are connected to the column outputs 502 ($O_C$) and 504 ($O_D$). Each of the row charge splitters provides a distinct charge split ratio. Similarly, each of the column charge splitters provides a distinct charge split ratio. These ratios determine the relative signals on the outputs as a result of a detection event at one or more of the detectors.

More specifically, the signal transferred from row line 202 to output 402 is proportional to the capacitance of capacitor 413, and the signal transferred from row line 202 to output 404 is proportional to the capacitance of capacitor 412. This behavior is also obtained for the other charge splitters. Thus the use of distinct charge split ratios for each row and column line provides position information. Preferably, the charge split ratio varies linearly across the array. For example, the $O_A$ capacitors can have a capacitance of $(1-k_i)C_0$ and the $O_B$ capacitors can have a capacitance of $k_iC_0$, where $C_0$ is a reference capacitance value, $k_i=i/(n+1)$, n is the number of rows in the array, and i is the row number. For $C_0=250$ pF and n=4, this gives charge splitter capacitance values as follows:

TABLE 1

| row # | $k_i$ | capacitances | reference #s |
|---|---|---|---|
| 1 | 1/5 | 200 pF, 50 pF | 413, 412 |
| 2 | 2/5 | 150 pF, 100 pF | 415, 414 |
| 3 | 3/5 | 100 pF, 150 pF | 417, 416 |
| 4 | 4/5 | 50 pF, 200 pF | 419, 418 |

This approach can also be employed for defining the capacitance values for the column charge splitters. For example, the capacitance values in Table 1 can also be assigned to the column charge splitting capacitors 512-519 following a similar pattern (e.g., add 100 to all reference numbers in the table).

Continuing this example, if a row output signal is obtained on outputs $O_A$ and $O_B$ such that A/B is about 4, then it can be inferred that this signal came from row 1 of the array. Similarly, C/D can be used to determine the column from which a signal came. It is important to note that the position sensitivity provided by this approach is analog. Thus, if A/B is less than 4 and more than 1.5, it can be inferred that the signal comes partly from row 1 and partly from row 2, and that the position is intermediate between rows 1 and 2. Interpolation can be employed to provide a quantitative position estimate. Since the row signals end up providing a position estimate relative to the rows, it is convenient to regard the resulting position as being the vertical position. Similarly, the column signals end up providing the horizontal position. In an preferred embodiment, the energy is recovered as E=A+B−C−D, the vertical position is recovered as Y=(A−B)/E, and the horizontal position is recovered as X=(C−D)/E.

The present approach can be regarded as providing output multiplexing, because the detector array output ends up being the four signals A, B, C, and D. This is a considerable reduction in complexity compared to a naive pixel-based approach for position sensitivity, where an N×N array of detectors would have $N^2$ outputs.

Practice of the invention does not depend critically on the level of integration employed for the detector array and associated circuitry. Monolithic integration, hybrid integration, and the use of discrete circuit components can all be practiced.

Figure 2:
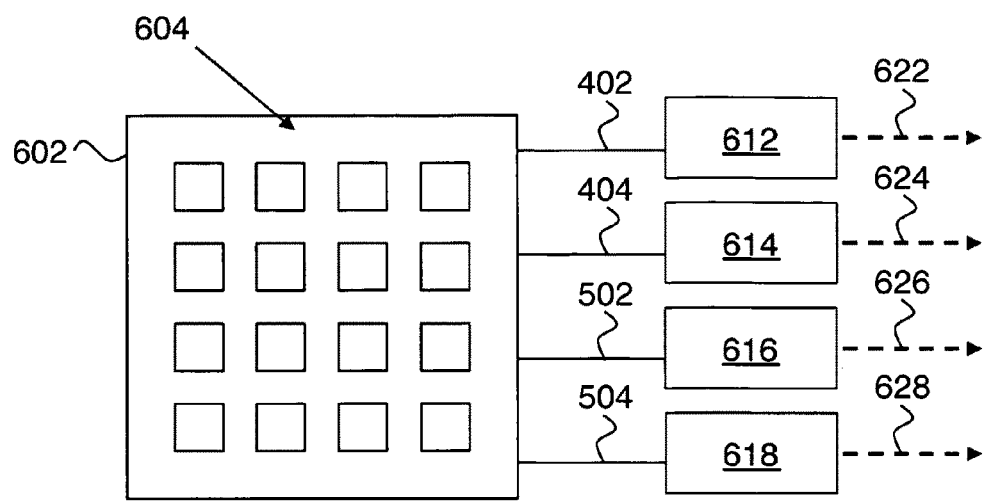
FIG. 2 shows a preferred output coupling approach for use with embodiments of the invention.

FIG. 2 shows a preferred output coupling approach for use with embodiments of the invention. In this example, a detector array 602 including detectors 604 is arranged as in FIG. 1 and has its position-sensitive outputs 402, 404, 502, and 504 (i.e., $O_A$, $O_B$, $O_C$, $O_D$ respectively) connected to low impedance output couplers. More specifically, detector array outputs 402, 404, 502, and 504 are connected to output couplers 612, 614, 616, and 618 respectively. It is preferred that the input impedance of these output couplers be 50Ω or less, and preferably as small as possible, to reduce signal loss. In some embodiments, these output couplers are low impedance electronic amplifiers that provide electrical outputs 622, 624, 626, and 628 respectively that are suitable for providing as output signals.

In other embodiments, these output couplers are optoelectronic couplers that provide optical outputs 622, 624, 626, and 628 respectively. Such optical coupling can be convenient in applications where a large amount of electrical noise is present (e.g., in medical imaging, where MRI systems tend to produce significant interference). Semiconductor lasers (e.g., vertical cavity surface emitting lasers) tend to have low input impedance, so one preferred output coupling approach is to connect the position sensitive outputs directly to the inputs of semiconductor lasers, without any intermediate electronic amplification or processing. This provide an efficient way to get detector array signals "off chip".

Experimental investigations have been performed for this approach. In one experiment, a 4×4 array of detectors was coupled to a single 3 mm×3 mm×20 mm LYSO (Lutetium Yttrium Orthosilicate) scintillation crystal to provide a multiplexed position sensitive output according to the present principles. A single-channel control experiment was performed with a single one of the detector elements coupled to this LYSO crystal. The single channel time resolution was 1.5±0.1 ns, while the multiplexed time resolution was 2.4±0.2 ns. The single channel energy resolution was 17.5±1.5%, while the multiplexed energy resolution was 22.1±0.5%. It was found that the multiplexing did not substantially degrade the time or energy resolution.

Figure 3:
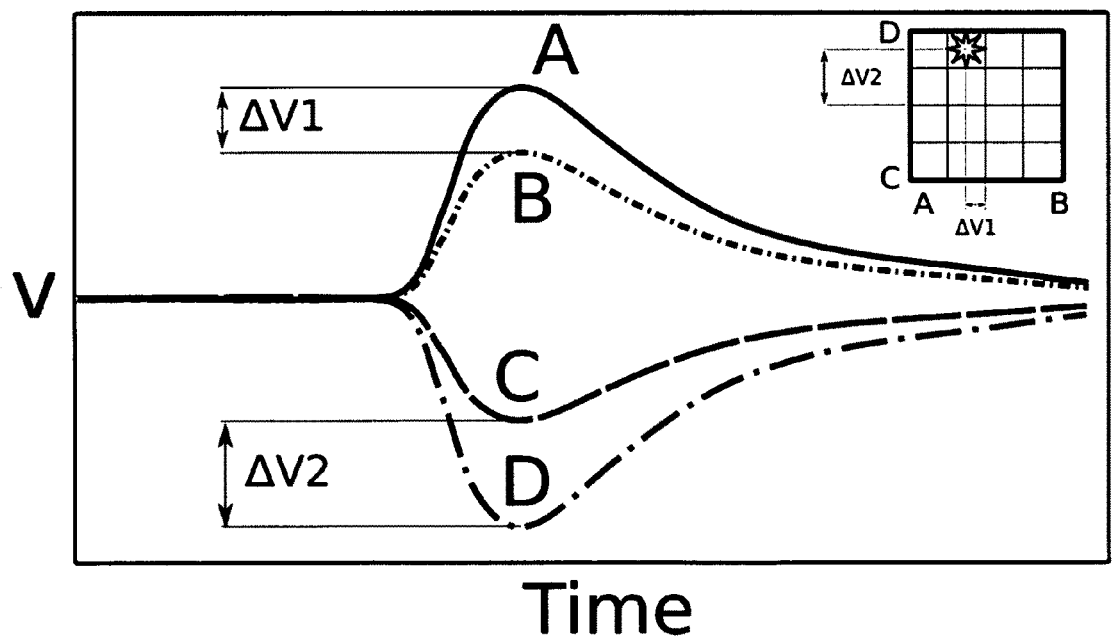
FIG. 3 shows example plots of detector array output signals.

FIG. 3 shows example plots of detector array output signals. In this example, a signal generated on the indicated (2, 4) position in the 4×4 array generates four signals with the corresponding relative ratio of 2/3 between A and B and 4/1 between C and D.

Figure 4A:
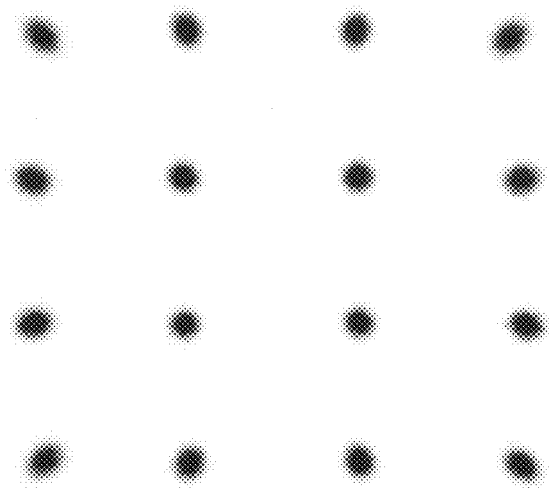
FIGS. 4a-b shows exemplary flood images from an embodiment of the invention.
Figure 4B:
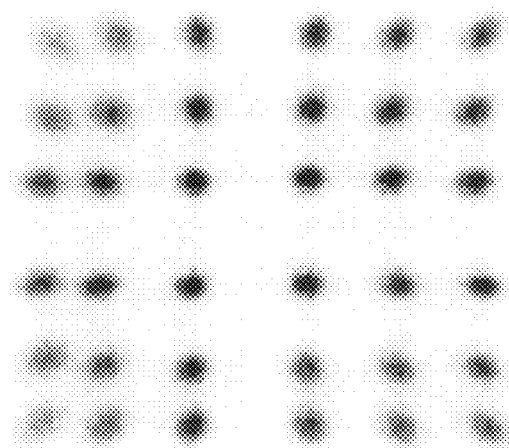

FIGS. 4a-b shows exemplary flood images from an embodiment of the invention. In the example of FIG. 4a, a 4×4 array of 3.2 mm×3.2 mm×20 mm LYSO scintillation crystals is coupled to a 4×4 detector array arranged as described in connection with FIG. 1. In the example of FIG. 4b, a 6×6 array of 2.1 mm×2.1 mm×20 mm LYSO scintillation crystals is coupled to a 4×4 detector array arranged as described in connection with FIG. 1. From these images, it is apparent that the spatial resolution provided by the scintillation crystal array is preserved by the position-sensitive detector array in both cases. In particular, the example of FIG. 4b demonstrates the ability of the detector array to provide position sensitivity at a finer resolution than the individual detector size.

The invention claimed is:

1. Apparatus comprising:
an array of detector elements logically arranged in a plurality of rows and a plurality of columns, wherein each of said detector elements is a two terminal device that provides a differential electrical signal at its terminals in response to incident radiation;
row outputs $O_A$ and $O_B$ having respective row output signals A and B and column outputs $O_C$ and $O_D$ having respective column output signals C and D, wherein said row and column outputs are connected to said array such that the total row output signal A+B and the total column output signal C+D are differential signals for any detection event sensed by said array;
a plurality of row lines, wherein each row of said detector elements corresponds to one of said row lines;
a plurality of column lines, wherein each column of said detector elements corresponds to one of said column lines;
a capacitive row charge splitter connected to each of said row lines, wherein said row charge splitters are all connected to said row outputs $O_A$ and $O_B$, wherein each row charge splitter determines the splitting of charge from its corresponding row line to said row outputs $O_A$ and $O_B$, and wherein each of said row charge splitters provides a distinct charge split ratio; and a capacitive column charge splitter connected to each of said column lines, wherein said column charge splitters are all connected to said column outputs $O_C$ and $O_D$, wherein each column charge splitter determines the splitting of charge from its corresponding column line to said column outputs $O_C$ and $O_D$, and wherein each of said column charge splitters provides a distinct charge split ratio;

wherein the relative amplitude of A and B for said detection event enables vertical position determination of said detection event;

wherein the relative amplitude of C and D for said detection event enables horizontal position determination of said detection event;

wherein each of said detector elements has one of its terminals connected to its corresponding row line and the other of its terminals connected to its corresponding column line.

2. The apparatus of claim 1, wherein anodes of all of said detector elements are connected to said row lines and wherein cathodes of all of said detector elements are connected to said column lines.

3. The apparatus of claim 1, wherein cathodes of all of said detector elements are connected to said row lines and wherein anodes of all of said detector elements are connected to said column lines.

4. The apparatus of claim 1, wherein said detector elements comprise solid state photomultipliers or avalanche photodiodes.

5. The apparatus of claim 1, further comprising opto-electronic couplers connected to said row outputs $O_A$ and $O_B$ and to said column outputs $O_C$ and $O_D$.

6. The apparatus of claim 5, wherein said optoelectronic couplers comprise vertical cavity surface emitting lasers.

7. The apparatus of claim 6, wherein no electronic amplification is performed between said outputs $O_A$, $O_B$, $O_C$, $O_D$ and said vertical cavity surface emitting lasers.

8. The apparatus of claim 1, further comprising amplifiers having an input impedance of 50Ω or less connected to said row outputs $O_A$ and $O_B$ and to said column outputs $O_C$ and $O_D$.

9. A method of providing position sensitive detection, the method comprising:

providing an array of detector elements logically arranged in a plurality of rows and a plurality of columns, wherein each of said detector elements is a two terminal device that provides a differential electrical signal at its terminals in response to incident radiation;

connecting said detector elements to row outputs $O_A$ and $O_B$ having respective row output signals A and B and to column outputs $O_C$ and $O_D$ having respective column output signals C and D such that the total row output signal A+B and the total column output signal C+D are differential signals for any detection event sensed by said array;

providing a plurality of row lines, wherein each row of said detector elements corresponds to one of said row lines;

providing a plurality of column lines, wherein each column of said detector elements corresponds to one of said column lines;

providing a capacitive row charge splitter connected to each of said row lines, wherein said row charge splitters are all connected to said row outputs $O_A$ and $O_B$, wherein each row charge splitter determines the splitting of charge from its corresponding row line to said row outputs $O_A$ and $O_B$, and wherein each of said row charge splitters provides a distinct charge split ratio; and providing a capacitive column charge splitter connected to each of said column lines, wherein said column charge splitters are all connected to said column outputs $O_C$ and $O_D$, wherein each column charge splitter determines the splitting of charge from its corresponding column line to said column outputs $O_C$ and $O_D$, and wherein each of said column charge splitters provides a distinct charge split ratio;

wherein the relative amplitude of A and B for said detection event enables vertical position determination of said detection event; and wherein the relative amplitude of C and D for said detection event enables horizontal position determination of said detection event;

wherein each of said detector elements has one of its terminals connected to its corresponding row line and the other of its terminals connected to its corresponding column line.

* * * * *